(12) United States Patent
Tsujimoto et al.

(10) Patent No.: US 7,567,365 B2
(45) Date of Patent: Jul. 28, 2009

(54) IMAGE READING APPARATUS

(75) Inventors: Koichiro Tsujimoto, Osaka (JP);
Tomohide Hozono, Osaka (JP); Shinichi Kotera, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 1090 days.

(21) Appl. No.: 10/855,791

(22) Filed: May 28, 2004

(65) Prior Publication Data
US 2005/0063022 A1 Mar. 24, 2005

(30) Foreign Application Priority Data
May 30, 2003 (JP) ............... 2003-154507

(51) Int. Cl.
*H04N 1/04* (2006.01)
(52) U.S. Cl. ............ 358/474; 358/497; 358/486; 399/211; 399/405
(58) Field of Classification Search ............. 358/474, 358/497, 496, 487, 501, 505, 494, 400, 402, 358/403; 399/211, 405
See application file for complete search history.

(56) References Cited

U.S. PATENT DOCUMENTS

| | | | | |
|---|---|---|---|---|
| 4,989,099 A | * | 1/1991 | Koshiyouji et al. | 358/474 |
| 5,239,392 A | * | 8/1993 | Suzuki et al. | 358/474 |
| 5,442,466 A | * | 8/1995 | Kameyama et al. | 358/498 |
| 5,535,012 A | * | 7/1996 | Matsumoto et al. | 358/400 |
| 5,661,572 A | * | 8/1997 | Kameyama et al. | 358/498 |
| 5,884,117 A | * | 3/1999 | Tanoue et al. | 399/1 |

(Continued)

FOREIGN PATENT DOCUMENTS

| | | |
|---|---|---|
| JP | 08095169 | 4/1996 |
| JP | 2001-142157 | 5/2001 |

OTHER PUBLICATIONS

Japanese Office Action cited in JP 2004-161246.

*Primary Examiner*—Negussie Worku
(74) *Attorney, Agent, or Firm*—Crowell & Moring LLP

(57) ABSTRACT

In order to provide an image reading apparatus of which a contact glass sheet can be replaced and recycled with ease without damaging the contact glass sheet when removing the same, and further intrusion of particles of dust into the apparatus when operating the apparatus can be prevented, an image reading apparatus having an image reading unit mounted to be able to be reciprocated in a frame body of the apparatus and a contact glass sheet is composed such that; the frame body comprises an upward-open lower frame in which the image reading unit is accommodated to be able to be reciprocated and an upper frame having an opening on the upper face thereof to be covered with the contact glass sheet, the upper and lower frames are assembled detachably by means of fitting portions provided to both frames, the contact glass sheet is attached to said upper frame by means of a strip-shaped adhesive member glued onto the undersurface of the upper frame along the brim part of the opening to be covered with the contact glass sheet, the strip-shaped adhesive member is glued onto the undersurface of the upper frame so that the strip is not continuous but partially interrupted to provide interrupted parts, and the glass sheet supports protruding from the lower frame are positioned to support the contact glass sheet at the position corresponding to the interrupted parts of the strip-shaped adhesive member.

14 Claims, 6 Drawing Sheets

U.S. PATENT DOCUMENTS

| | | | |
|---|---|---|---|
| 6,115,146 A * | 9/2000 | Suzuki et al. | 358/474 |
| 6,661,538 B1 * | 12/2003 | Takeuchi | 358/474 |
| 7,031,028 B2 * | 4/2006 | Liu et al. | 358/406 |
| 7,202,980 B2 * | 4/2007 | Hayashi | 358/475 |
| 7,224,499 B2 * | 5/2007 | Mikajiri et al. | 358/474 |
| 7,233,420 B2 * | 6/2007 | Hayashi | 358/497 |
| 2001/0000979 A1 * | 5/2001 | Han et al. | 358/474 |

* cited by examiner

IMAGE READING APPARATUS

BACKGROUND OF THE INVENTION

1. Field of the Invention

The present invention is related to an image reading apparatus in which an image reading unit integrating a CCD (Charge Coupled Device) and an optical system comprising a reflection mirror, a condensing lens, etc. is installed to reciprocate in a frame body, specifically an image reading apparatus provided with a contact glass sheet on the upper face of the flame body and a sheet of manuscript to be read is placed on the contact glass sheet when reading.

2. Description of the Related Art

Recently, recycling of constituent parts of industrial machines is proceeding in all industrial circles. As to copying machines and scanner, etc., frames, etc. are generally made of plastic material, and the optical system integrated in the image reading unit is fixed by means of screws and the like for allowing it to be adjusted. Therefore, said optical system is easily detachable for recycling or replacement. The contact glass sheet, on which a sheet of manuscript is to be placed, attached onto the frame body and a slit glass sheet for reading manuscript provided adjacent to the contact glass sheet are also fixed to the frame body by means of fixing members for example as shown in Japanese Laid-Open Patent Application No.2001-142157 for easing replacement or recycling of the glass sheet when the glass sheet are smeared.

For example, FIG. 7 shows a schematic representation of an image reading apparatus of said prior art. In the drawing, a longitudinal scale plate 101*a* and a vertical scale plate 101*b* of scale plates 101 are adhered to a contact glass sheet 102 along two sides thereof respectively by means of double-sided adhesive tape 104 or the like, then the contact glass sheet 102 pasted with the scale plates 101 are placed on a frame body 103 while inserting protrusions 111 of the scale plates 101 into holes 103*a* provided on the frame body 103. Lastly, a cover 105 (an example of fixing member) for covering the edge part of said scale plates 101 is fixed to the frame body 103 to fixate the scale plates 101 and contact glass sheet 102 on the frame body 103.

However, with the composition like this, first the scale plates 101 are adhered to the two sides of the contact glass sheet and then the contact glass sheet pasted with the scale plates is fixed to the frame body by fitting the protrusions 111 formed on the scale plates into the holes 103*a* formed on the frame body 103, and further the cover must be attached over the scale plates, so assembling man-hour increases, and further as the contact glass sheet 102 contacts directly to the frame body 103 without using adhesive tape, there is a tendency that clearance is created between the contact glass sheet 102 and frame body 103 due to insufficient flatness of the mating surfaces. Therefore, particles of dust tend to intrude from outside by the effect of air stream produced by the travel of the image reading unit accommodated in the frame body.

Further, when detaching the contact glass sheet from the frame body, the longitudinal plate 101*a* and vertical plate 101*b* of the scale plate 101 must be removed, but it is considerably difficult to remove the thin scale plate adhered to the contact glass sheet by means of double-sided adhesive tape 104.

Particularly, when the rear faces of the scale plates are adhered by means of double-sided adhesive tape all over to the contact glass sheet, if a flat-blade screwdriver-like tool is used to strip the scale plates from the contact glass sheet, it is not only difficult to remove the scale plates because the scale plates are thin, but also the contact glass sheet may be hurt or broken due to strong adhering force of the double-sided adhesive tape, resulting in that recycling becomes impossible.

SUMMARY OF THE INVENTION

The present invention is made in light of the problems mentioned above, and an object is to provide an image reading apparatus with which recycling or replacement of the contact glass sheet is easily done, breakage of the contact glass sheet when removing it is prevented, and further intrusion of dust when the image reading unit is moving is prevented.

Another object of the invention is to provide an image reading apparatus of which the contact glass sheet can be easily attached to or detached from the frame body.

A further object of the invention is to provide an image reading apparatus in which the positioning of the contact glass sheet relative to the lower flame can be done in a convincing way and the contact glass sheet can be retained positively even if there occurs decrease in adhesive force of the double-sided adhesive tape gluing the contact glass sheet onto the upper frame.

To achieve the objects mentioned above, the present invention proposes an image reading apparatus having an image reading unit in which a CCD and an optical system are incorporated mounted to be able to be reciprocated in the frame body of the apparatus and a contact glass sheet on which a manuscript sheet is placed to be scanned mounted on the frame body, characterized in that said frame body comprises an upward-open lower frame in which said image reading unit is accommodated to be able to be reciprocated in the longitudinal direction of the frame body and an upper frame having an opening on the upper face thereof to be covered with said contact glass sheet, said upper and lower frames are assembled detachably by means of fitting portions provided to both frames, and glass sheet supports are provided to protrude from said lower frame to support the undersurface of said contact glass sheet.

By the invention like this, the contact glass sheet can be positively positioned relative to the lower frame, for glass supports are provided to protrude from the lower frame, and the contact glass sheet can be retained positively even if there occurs decrease in adhesive force of the double-sided adhesive tape gluing the contact glass sheet onto the upper frame.

The invention is particularly characterized in that said contact glass sheet is attached to said upper frame by means of a strip-shaped adhesive member glued onto the undersurface of the upper frame along the brim part of the opening to be covered with the contact glass sheet, said strip-shaped adhesive member is glued onto the undersurface of the upper frame so that the strip is not continuous but partially interrupted to provide interrupted parts and is capable of being removed off, and said glass sheet supports protruding from the lower frame are positioned to support the contact glass sheet at the position corresponding to said interrupted parts.

Here, said adhesive member includes a strip-shaped adhesive member glued to the degree of being able to be removed off, and the strip-shaped adhesive member is not limited to a double-sided adhesive tape which is made of tape-shaped base material with an adhesive applied to both faces thereof, but includes a single-sided adhesive tape of which one side is fixed to the upper frame.

According to the invention, when attaching the contact glass sheet, the strip-shaped adhesive member is adhered to the undersurface of the upper frame along the brim part of the opening to be covered with the contact glass sheet such that the strip-shaped adhesive member is not continuous but partially interrupted to form interrupted parts, then the contact glass sheet is put in place to be adhered to the upper frame by means of the strip-shaped adhesive member. Then the upper frame with the contact glass sheet stuck thereto in place is assembled with the lower frame by means of fitting parts provided to the upper and lower frame, thus the assembling is extremely eased.

As the contact glass sheet is stuck to the upper frame by means of the strip-shaped adhesive member glued onto the undersurface of the upper frame along the brim part of opening to be covered with the contact glass sheet, the contact glass sheet does no exists on the upper face of the upper frame and scale can be printed or scale plates can be glued on the upper face of the upper frame. Therefore, the scale plates need not be contacted directly with the contact glass sheet.

When removing the contact glass sheet, first the upper and lower frame are disassembled, then the contact glass sheet can be easily removed off from the upper frame by inserting a flat-blade screwdriver-like tool into the interrupted part of the strip-shaped adhesive member (preferably a double-sided adhesive tape) to remove off the contact glass sheet from the double-sided adhesive tape which glues the peripheral part of the contact glass sheet onto the undersurface of the upper frame along brim part of the opening so that the glass sheet can be substantially removed off.

It is of course necessary to provide an opening having a width for inserting the tool to remove off the glass sheet in the side wall of the upper frame at the position corresponding to each of the interrupted parts of the strip-shaped adhesive member. By removing off the contact glass sheet through inserting the tool from the opening to remove off the glass sheet from the double-sided adhesive tape, the contact glass sheet can be removed off from the upper frame without damaging the contact glass sheet, and removed contact glass sheet can be reused as it is removed, resulting in an improvement in recycling efficiency.

Now, as the strip-shaped adhesive member is adhered to the undersurface of the upper frame along the brim part of the opening to be covered with the contact glass sheet such that the strip-shaped adhesive member is not continuous but partially interrupted to form interrupted parts, there is a possibility that dust intrudes through the interrupted parts and the optical system of the image reading unit accommodated in the frame body is contaminated.

According to the present invention, each of the glass supports protruding from the lower frame presses the adhesive member at the both side parts of each interrupted part and the gap between the undersurface of the upper frame and the upper surface of the contact glass sheet in the interrupted part is substantially reduced to very small.

Particularly, as the substratum of the double-sided adhesive tape is made of thin sponge material, the thin sponge strip is substantially crushed by the pressing force of the glass sheet supports protruding from the lower frame acting from under side and the pressing force from upper side to assemble the upper and lower frames by fitting the fitting portions of the upper and lower frames, and the gap is reduced to a minimum (near zero). Therefore, intrusion of particles of dust from outside induced by the reciprocation of the image reading unit when operating the apparatus can be prevented.

The width of the glass support is preferably equal to or larger than the width of the interrupted part of the strip-shaped adhesive member. The thin sponge strip is crushed to be substantially near zero in thickness to leave near zero gap between the undersurface of the upper frame and the upper surface of the contact glass sheet.

Therefore, intrusion of particles of dust into the apparatus due to the formation of the interrupted parts can be prevented, and the stable operation of the apparatus is possible.

It is preferable in the invention that said interrupted parts are located in the two opposing sides of the opening, which is covered with the contact glass sheet, of the upper frame, and the positions of the interrupted parts located in one of the opposing sides and those of the interrupted parts located in the other of the opposing sides are staggered.

By configuring like this, even if the interrupted parts are located in the upstream and downstream sides of the air stream induced by the reciprocation of the image reading unit, the air stream passed through the interrupted parts in the upstream side is difficult to pass through the interrupted parts in the downstream side, for the position of interrupted parts in the upstream side and those of the interrupted parts in the downstream side are staggered. Therefore, intrusion of particles of dust into the apparatus, that might occur if the air stream passing through the upstream side interrupted parts flows directly to the down side interrupted parts, can be suppressed further.

The glass sheet supports protruding from the lower frame are provided to locate in the two opposing sides of the opening, which is covered with the contact glass sheet, of the upper frame, and the positions of the glass sheet supports in one of the opposing sides and those of the glass sheet supports provided to locate in the other of the opposing sides are staggered, the positions of the glass sheet supports corresponding to those of the interrupted parts.

It is preferable that the interrupted parts and glass supports are located so that they differs in number in the two opposing sides and those located in each side are arranged symmetrically about the center line crossing the sides.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
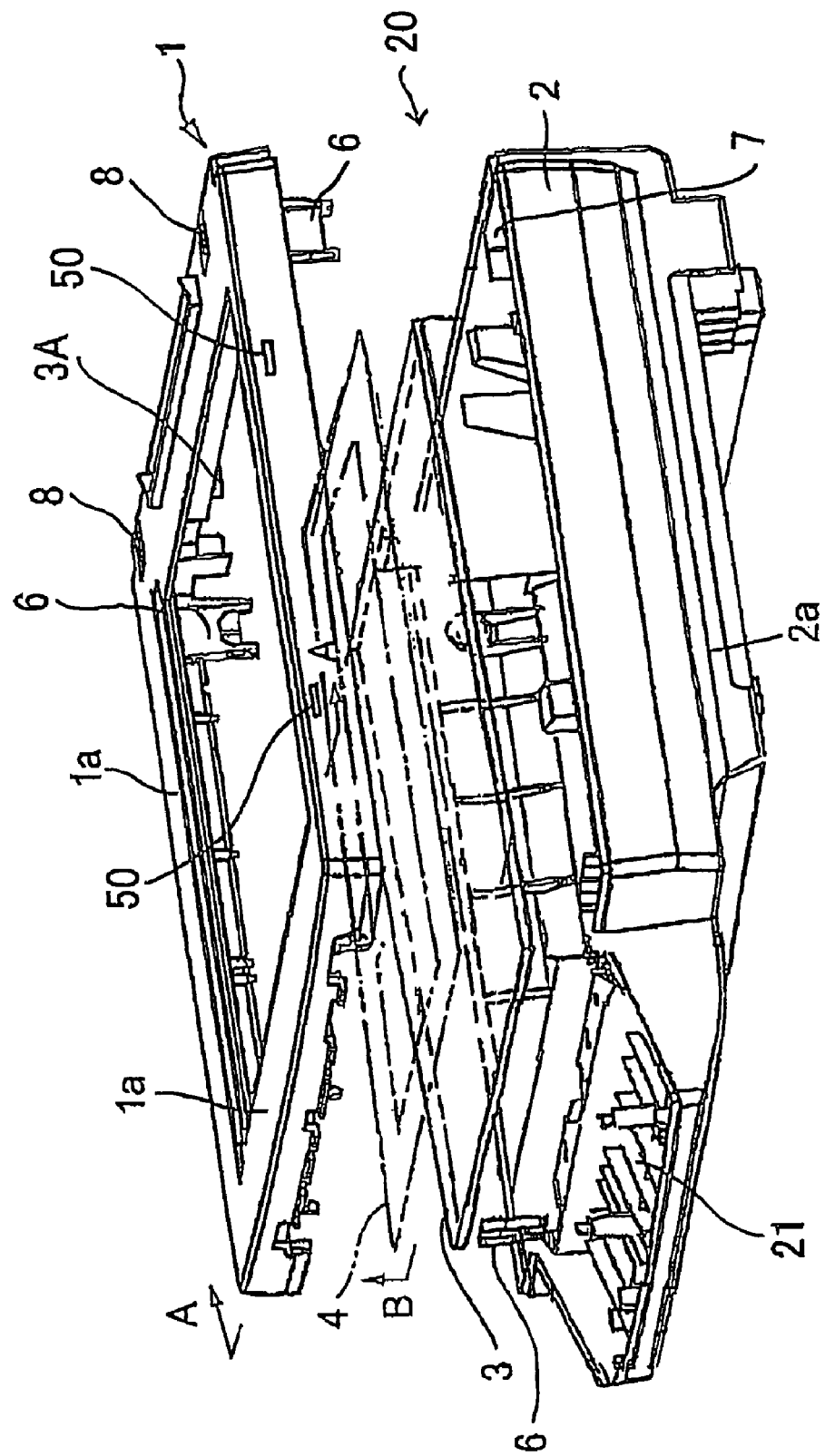
FIG. 1 is an exploded perspective view of the frame body of an embodiment of the image reading apparatus according to the present invention having only contact glass sheet in the case without a manuscript auto-feeding mechanism.
Figure 2:
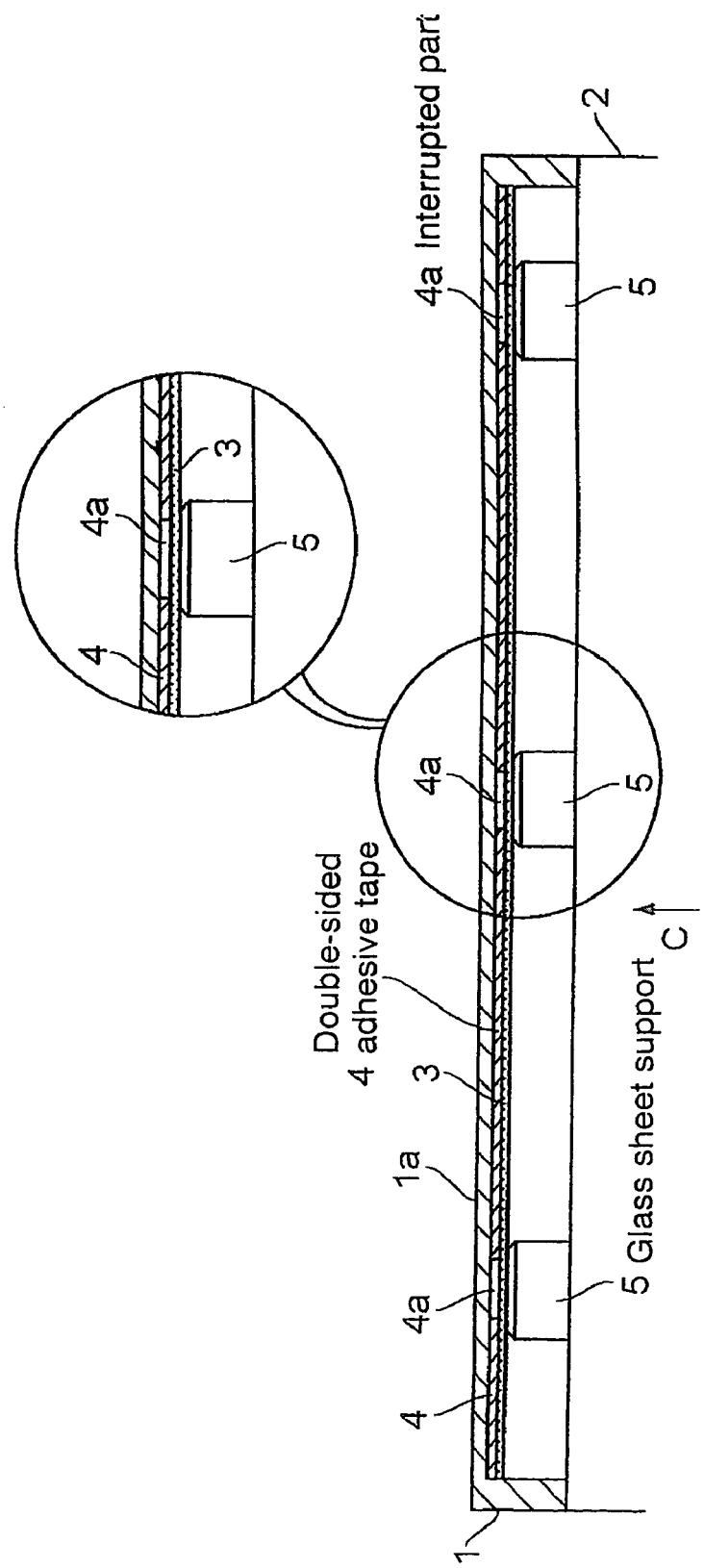
FIG. 2 is a cross-sectional view along line A-A in FIG. 1.
Figure 3:
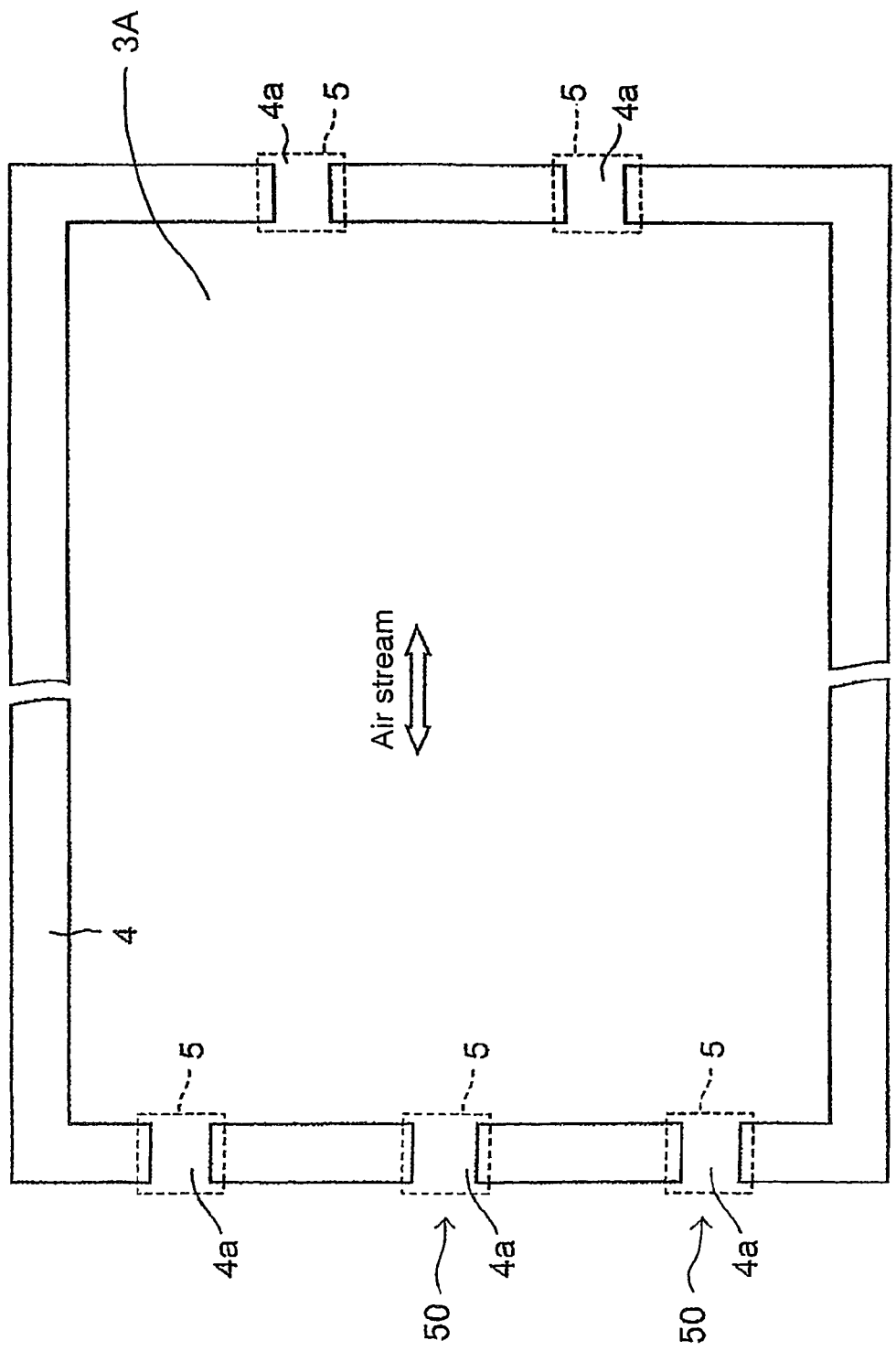
FIG. 3 is a drawing for explaining the positioning relation of glass sheet supporters to a double-sided adhesive tape.
Figure 4:
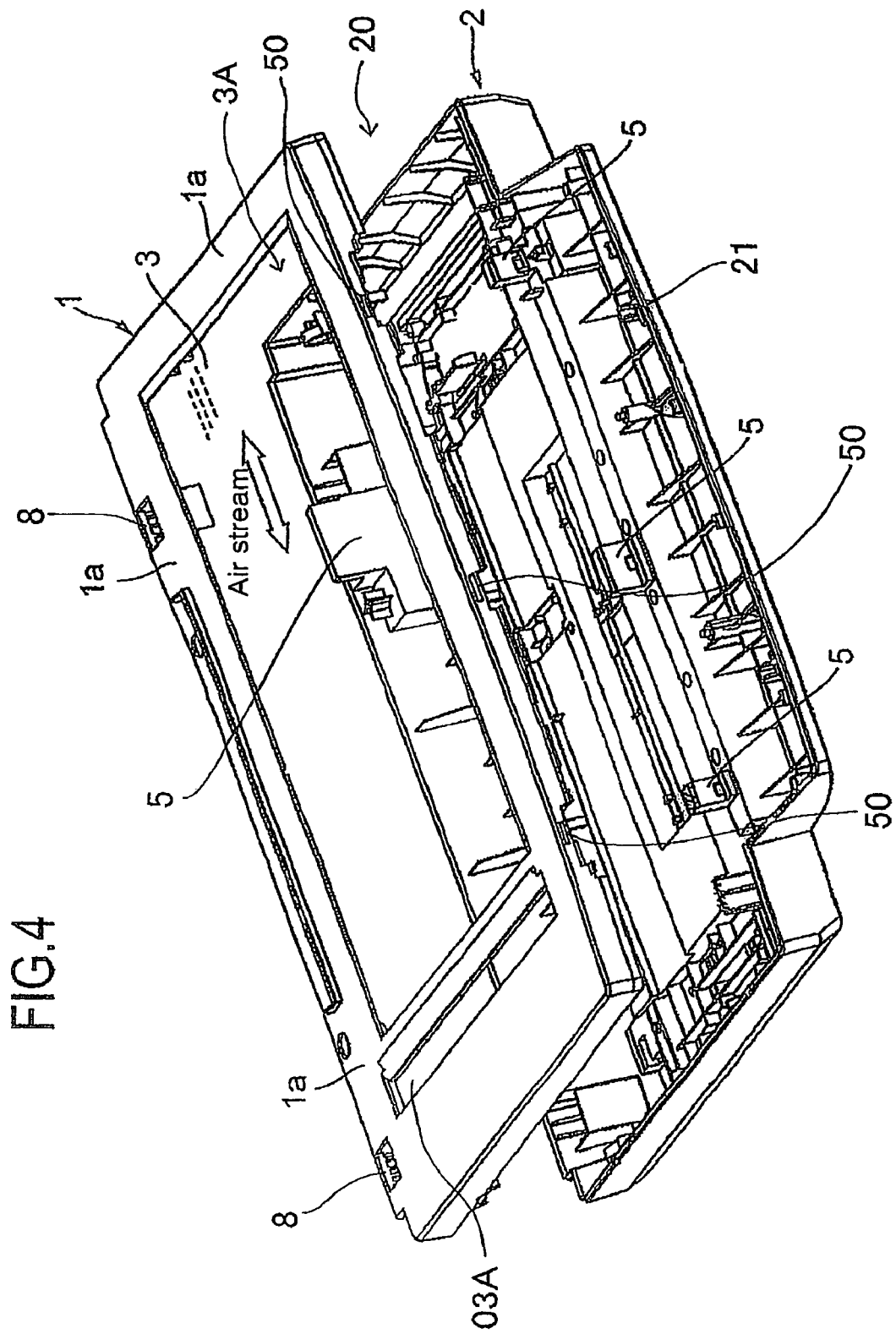
FIG. 4 is an exploded perspective view of the frame body of another embodiment of the image reading apparatus according to the present invention having a contact glass sheet and a slit glass sheet in which an auto-feeder type manuscript reading mechanism can be mounted.
Figure 5:
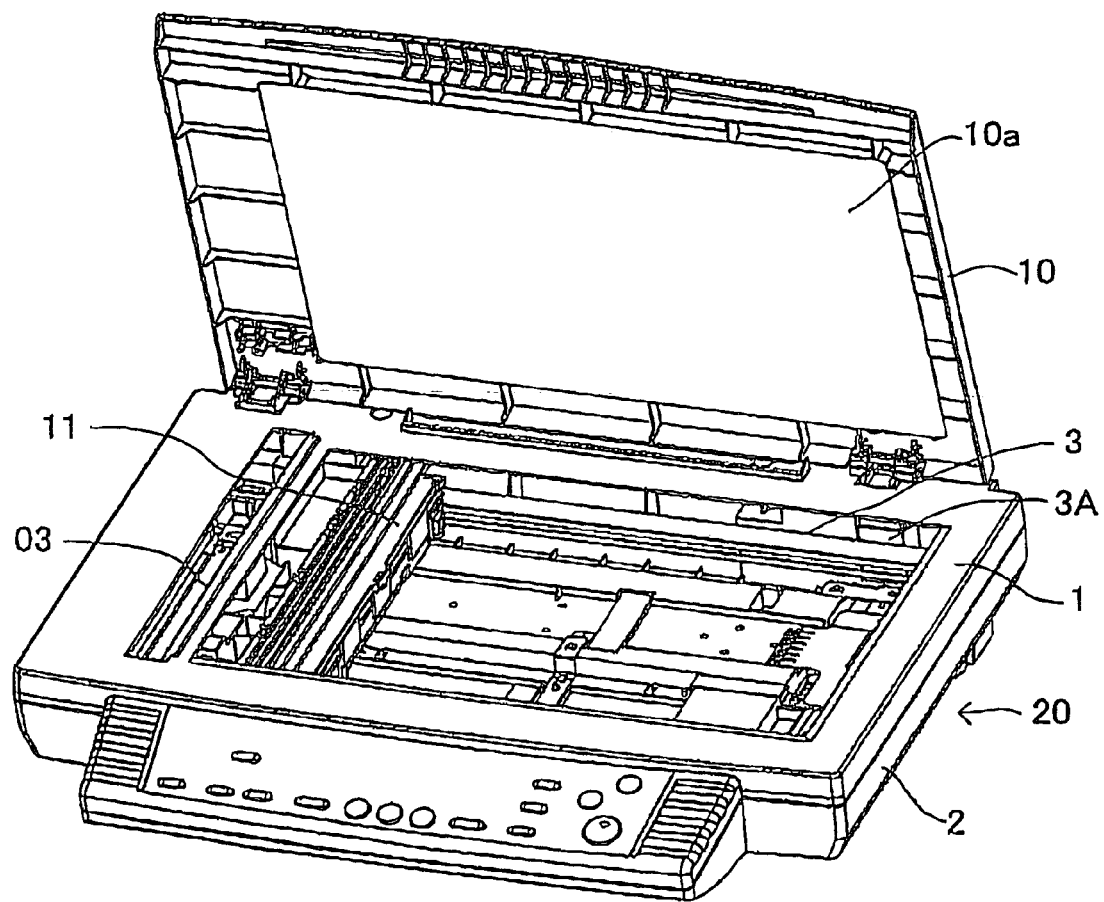
FIG. 5 is a perspective view of the image reading apparatus of FIG. 4 showing overall structure thereof.
Figure 7:
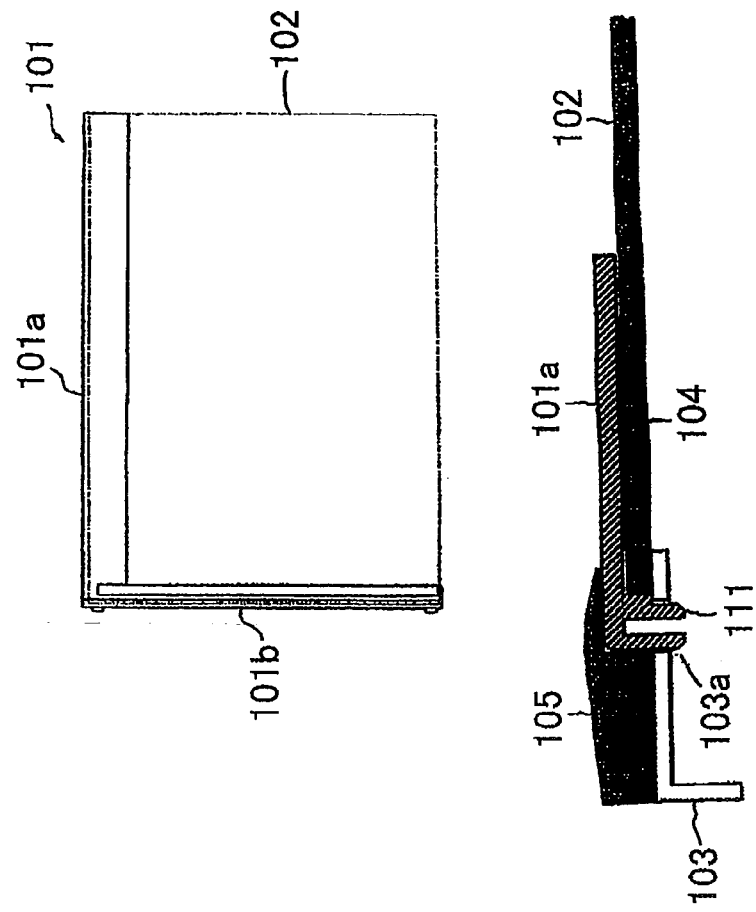
FIG. 7 is a schematic representation of an image reading apparatus of prior art.
Figure 6:
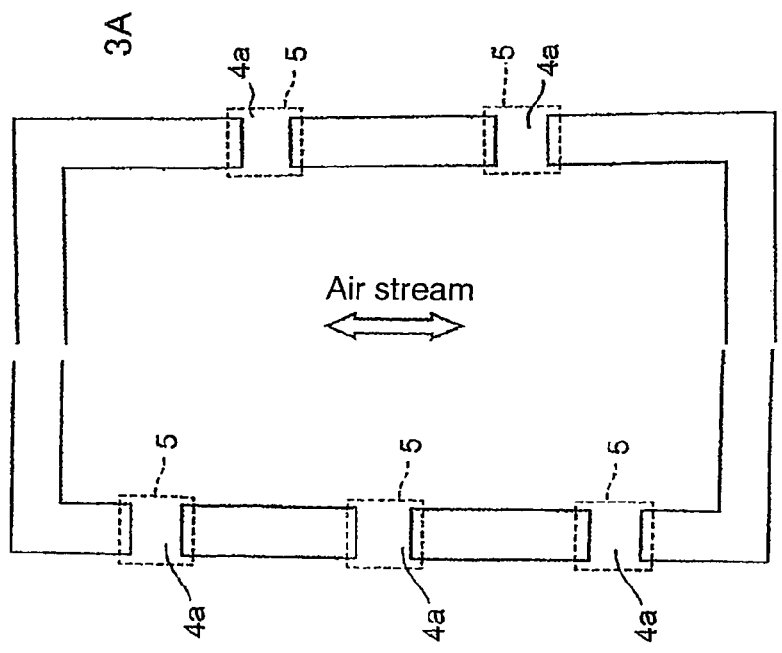
FIG. 6 is a drawing for explaining the positioning relation of glass sheet supporters to a double-sided adhesive tape in FIG. 4.

FIG. 1 is an exploded perspective view of the frame body of an embodiment of the image reading apparatus according to the present invention having only contact glass sheet in the case without a manuscript auto-feeding mechanism, FIG. 2 is a cross-sectional view along line A-A in FIG. 1, and FIG. 3 is a drawing for explaining the positioning relation of glass sheet supports to a double-sided adhesive tape. FIG. 4 is an exploded perspective view of the frame body of another embodiment of the image reading apparatus according to the present invention having a contact glass sheet and a slit glass sheet in which an auto-feeder type manuscript reading mechanism can be mounted, and FIG. 5 is a perspective view of the image reading apparatus of FIG. 4 showing overall structure thereof. FIG. 6 is a drawing for explaining the positioning relation of glass sheet supports to a double-sided adhesive tape in FIG. 4.

The image reading apparatus according to the present invention is provided as shown in FIG. 5 with a flat, rectangular frame body 20; a contact glass sheet 3 provided on the upper face of the frame body 20, a manuscript sheet being to be placed on the contact glass sheet 3 when reading the manuscript; an image reading unit 11 integrating a CCD unit and an optical system; and a cover 10 having a white reflecting plate 10a glued on the rear face thereof by means of a sponge sheet to hold-down a manuscript sheet placed on the contact glass sheet 3. The frame body 20 comprises an upward-open lower frame 2 in which the image reading unit 11 is accommodated to be able to be reciprocated in the longitudinal direction of the frame body and an upper frame 1 having an opening 3A on the upper face thereof to be covered with a contact glass sheet. Both the frames 1 and 2 can be assembled detachably at fitting portions 6 and 7 (see FIG. 1) provided to the upper and lower frame respectively.

The lower frame 2 is provided with an operating panel attaching part 21 to a longitudinal side in the case of the embodiment of FIG. 4 and to a shorter side in the case of the embodiment of FIG. 1. Concave parts 7 are formed for example in the four corners of the lower frame body 2 to receive convex parts 6 formed for example in the four corners of the upper frame body 1. Cuboidal glass sheet supports 5 each having a flat top face protrude from the lower frame body so that the top faces contact the undersurface of the contact glass sheet 3 at the positions where the top faces are to face the interrupted parts of double-sided adhesive tape through the contact glass sheet 3 as described later. A well known image reading unit comprising an exposing lamp, miller, lens, charge coupled device unit (CCD unit), etc. (all are not shown in the drawings) is accommodated in the lower frame 2 to be able to be reciprocated in the longitudinal direction.

The upper frame 1 and lower frame 2 have convex parts 6 and concave parts 7 respectively at positions along the four sides of the frames including four corners, each of the concave parts receives corresponding convex parts when assembling both the frames. An opening 3A to be covered with a rectangular contact glass sheet 3 is formed in both embodiments shown in FIG. 1~3 and in FIG. 4~6. In the case of the embodiment shown in FIG. 4~6, an opening 03A to be covered with a strip-shaped slit glass sheet is formed adjacent to a shorter side of the rectangular opening 3A. In FIG. 5, a slit glass sheet 03 attached to cover the opening 03A is discerned. The slit glass sheet 03 is formed in a strip-shape, and as the width thereof is small, it is suitable to attach the slit glass sheet by a conventional method.

On the upper surface of the upper frame, scale plates not shown in the drawings are stuck or scales are printed outside the periphery of the contact glass sheet. Positions 8 of hinges attached to the upper frame 1 to allow the cover 10 to be opened or closed are located on a longitudinal side opposite to the operating panel attaching part 21 of the lower frame in the embodiment shown in FIG. 4~6, and in the embodiment shown in FIG. 1~3, the hinge attaching positions 8 are provided on a shorter side opposite the operating panel attaching part 21 of the frame, for the operating panel attaching part 21 is positioned on a shorter side of the lower frame.

In either embodiments, the rectangular contact glass sheet 3 is attached to the upper frame 1 by means of the double-sided adhesive tape 4 adhered to the undersurface of the upper frame 1 along the brim part of the opening 3A, whereby the double-sided adhesive tape 4 is adhered in a discontinuous figuration such that positions corresponding to the glass sheet supports 5 protruding from the lower frame are interrupted to form interrupted parts 4a. Slit openings 50 are provided in the side wall of the upper frame 1 at the positions corresponding to said interrupted parts 4a of the double-sided adhesive tape 4 so that a head screwdriver-like tool (not shown in the drawings) can be inserted when removing off the contact glass sheet 3 from the upper frame 1.

The present invention is related to the composition of an image reading apparatus having a contact glass sheet attached thereto as mentioned in the forgoing, and each embodiment will be detailed hereunder.

FIGS. 1~3 show a first embodiment of the image reading apparatus of manuscript placing type (platen traveling type) without a slit glass sheet. The contact glass sheet 3 covers nearly all over the upper frame 1. The contact glass sheet 3 is fixed to the upper frame 1 on the undersurface of the upper peripheral plate 1a thereof by means of double-sided adhesive tape (strip-shaped adhesive member) 4 as shown in FIG. 1, 2 to cover the opening 2a of the lower frame 2 when the upper frame is assembled with the lower frame. The double-sided adhesive tape 4 running along the undersurface of the upper peripheral plate 1a is formed such that there are partially interrupted parts 4a as shown in FIG. 3. The interrupted parts 4a of the double-sided adhesive tape 4 are positioned to correspond to the positions of the glass sheet supports 5 as described later and the width of each interrupted part 4a is a little narrower than that of each glass sheet support 5.

In FIG. 3, reference numeral 5 is glass sheet supports protruding upward from the lower frame 2. Each of the glass sheet supports 5 is provided to correspond to each of the interrupted parts 4a of the double-sided adhesive tape 4 so that the top flat face thereof contacts the underside surface of the contact glass sheet 3 at the position facing the corresponding interrupted part 4a to cover the discontinuity formed by the interrupted part 4a as shown in FIG. 3. The width of the top flat face of the glass sheet support 5 is determined to be about equal to or larger then the width of the interrupted part 4a.

The glass sheet supports 5 and interrupted parts 4a are provided in the upstream side and downstream side of an air stream induced by the travel of the image reading unit 11 and arranged in the direction orthogonal to the air stream, that is, arranged in two shorter sides of the opening 3A, such that the positions of the interrupted parts in the upstream side and downstream side are staggered, i.e., such that the centerlines in the longitudinal direction of the interrupted parts in one of the shorter sides do not coincide with those of the interrupted parts in the other shorter sides.

Each of the glass sheet supports 5 is provided to correspond to each of the interrupted parts 4a. The number of the interrupted parts 4a and corresponding glass sheet supports 5 are different in both of the shorter sides. Concretively, as shown in FIG. 3, two of them are located in the right shorter side symmetrically about the midsection of the shorter side, and in left shorter side three of them are located, one in the midsection and two in positions symmetrical about the midsection.

With the embodiment, the double-sided adhesive tape 4 is adhered to the undersurface of the upper peripheral plate 1a of the upper frame 1 along the brim part of the opening 3A to be covered with the contact glass sheet 3 such that the strip-shaped adhesive member is not continuous but partially interrupted to form interrupted parts 4a, that means that the upper surface of the contact glass sheet 3 is not completely sealed against the undersurface of the upper frame 1 when the contact glass sheet 3 is attached to the upper frame 1. Then the contact glass sheet 3 is put in place to be adhered to the upper frame 1 by means of the double-sided adhesive tape. Then the upper frame 1 with the contact glass sheet 3 stuck thereto in place is assembled with the lower frame 2 by means of fitting parts 6, 7, thus the assembling is extremely eased.

In this case, although there is a possibility that particles of dust intrude through the gaps corresponding to the thickness of the tape in the interrupted parts 4a and the optical system of the image reading unit 11 accommodated in the frame body 20 is contaminated, according to the embodiment each glass support 5 protruding from the lower frame 2 presses the tape at both side parts of each interrupted part 4a and the gap in the interrupted part is substantially reduced to very small.

Particularly, as the substratum of the double-sided adhesive tape is made of thin sponge material, the thin sponge strip is substantially crushed by the pressing force of the glass sheet supports 5 protruding from the lower frame acting from under side and the pressing force from upper side to assemble the upper and lower frame 1, 2 by means of the fitting portions 6, 7, and the gap is reduced to a minimum (near zero). Therefore, intrusion of particles of dust from outside induced by the reciprocation of the image reading unit when operating the apparatus can be prevented.

As the top of the glass sheet support is flat and the width of the glass sheet support is wider than the interrupted part of the double-sided adhesive tape, the thin sponge strip is crushed to be substantially near zero in thickness to leave near zero gap between the undersurface of the upper peripheral plate 1a and the upper surface of the contact glass sheet 3.

Therefore, intrusion of particles of dust into the apparatus due to the formation of the interrupted parts 4a can be prevented.

When removing the contact glass sheet 3, first the upper and lower frame 1, 2 are disassembled, then the contact glass sheet 3 can be easily removed off from the upper frame 1 by inserting a flat-blade screwdriver-like tool (not shown in the drawings) in the interrupted parts to remove off the contact glass sheet from the double-sided adhesive tape which glues the peripheral part of the contact glass sheet 3 onto the undersurface of the upper peripheral plate 1a of the upper frame 1 along the brim part of the opening 3A so that the glass sheet can be substantially removed off.

It is of course necessary to provide an opening 50 having a width for inserting the tool to remove off the glass sheet in the side wall of the upper frame 1 at the position corresponding to each of the interrupted part of the double-sided adhesive tape. By removing off the contact glass sheet 3 through inserting the tool from each of the openings 50 to remove off the glass sheet 3 from the double-sided adhesive tape, the contact glass sheet can be removed off from the upper frame without damaging the contact glass sheet, and removed contact glass sheet can be reused as it is removed, resulting in an improvement in recycling efficiency.

In the embodiment, as the interrupted parts of the double-sided adhesive tape located in the shorter sides, that are orthogonal to the reciprocating directions of the image reading unit, of the rectangular opening are located such that the positions of the interrupted parts in one of the shorter sides and those of the interrupted parts in the other shorter side are staggered, that is, the center lines in the longitudinal direction of the interrupted parts in one of the shorter sides do not coincide with those of the interrupted parts in the other shorter side, the air stream induced by the reciprocation of the image reading unit and passed through the interrupted parts in the upstream side is difficult to pass through the interrupted parts in the downstream side. Therefore, intrusion of particles of dust into the apparatus, that might occur if the air stream passing through the upstream side interrupted parts flows directly to the down side interrupted parts, can be suppressed further.

By locating the interrupted parts in the shorter sides of the opening so that they are different in number in both sides and symmetrical about the midsection of the shorter sides, the contact pressure between the upper frame and the contact glass sheet is dispersed evenly.

In the embodiment shown in FIG. 4, the slit glass sheet 03 is located adjacent to the shorter side of the contact glass sheet 3, so the glass sheet supports 5 can not be provided in the shorter side where the slit glass sheet is located.

Therefore, the glass sheet supports 5 are provided in the longer sides where an operation board is attached on one side and cover hinges are attached on the other side. The interrupted parts of the double-sided adhesive tape 4 are located in the longer sides to correspond to each of the glass sheet supports 5 as shown in FIG. 6.

Also in this case, the interrupted parts 4a is positioned to correspond to the glass sheet supports 5 and the width of each of the interrupted parts 5 is smaller than that of each glass sheet support 5.

That is, as shown in FIG. 6, the glass sheet supports 5 and the interrupted parts 4a are arranged in the sides parallel to the air stream induced by the reciprocation of the image reading unit 11, i.e. the glass sheet supports 5 and the interrupted parts 4a are located in the longer side of the frame body. Two interrupted parts and corresponding glass sheet supports are located in a longer side where the hinges for connecting the cover 10 are located and three interrupted parts are located in the other longer side where the operation board 21 is located, of which one is located at the midsection of the longer side and two are located symmetrically about the midsection.

In this case, there is no interrupted part in the shorter sides.

As has been described in the foregoing, according to the present invention, an image reading apparatus can be provided, of which the contact glass sheet can be replaced and recycled with ease without damaging the contact glass sheet when removing the same, and further intrusion of particles of dust into the apparatus when operating the apparatus can be prevented.

What is claimed is:

1. An image reading apparatus having an image reading unit in which a CCD and an optical system are incorporated mounted to be able to be reciprocated in the frame body of the apparatus and a contact glass sheet on which a manuscript sheet is placed to be scanned mounted on the frame body, wherein said frame body comprises an upward-open lower frame in which said image reading unit is accommodated to be able to be reciprocated in a longitudinal direction of the frame body and an upper frame having an opening on the upper face thereof to be covered with said contact glass sheet, said upper and lower frames are assembled detachably by means of fitting portions provided to both frames, and glass sheet supports are provided to protrude from said lower frame to support the undersurface of said contact glass sheet.

2. The image reading apparatus according to claim 1, wherein said contact glass sheet is attached to said upper frame by means of a strip-shaped adhesive member glued onto the undersurface of the upper frame along the brim part of the opening to be covered with the contact glass sheet, said strip-shaped adhesive member is glued onto the undersurface of the upper frame so that the strip-shaped adhesive member is not continuous but partially interrupted to provide interrupted parts, and said glass sheet supports protruding from the lower frame are positioned to support the contact glass sheet at the position corresponding to said interrupted parts.

3. The image reading apparatus according to claim 2, wherein each of said glass supports is shaped such that it can press both edge parts of each of said interrupted parts of the strip-shaped adhesive member through the contact glass sheet.

4. The image reading apparatus according to claim 2, wherein a width of said glass support is equal to or wider than a width of the interrupted part.

5. The image reading apparatus according to claim 2, wherein said interrupted parts are located in two opposing sides of the opening, which is covered with the contact glass sheet, of the upper frame, and the positions of the interrupted parts located in one of the opposing sides and those of the interrupted parts located in the other of the opposing sides are staggered.

6. The image reading apparatus according to claim 5, wherein the glass sheet supports protruding from the lower frame are provided to locate in the two opposing sides of the opening, which is covered with the contact glass sheet, of the upper frame, and the positions of the glass sheet supports in one of the opposing sides and those of the glass sheet supports provided to locate in the other of the opposing sides are staggered, the positions of the glass sheet supports corresponding to those of the interrupted parts.

7. The image reading apparatus according to claim 5, wherein said interrupted parts and glass supports are located so that they differs in number in the two opposing sides and those located in each side are arranged symmetrically about the center line crossing the sides.

8. The image reading apparatus according to claim 5, wherein said interrupted parts are located in the shorter sides of the opening, which is covered with the contact glass sheet, of the upper frame, the shorter sides being orthogonal to the reciprocating direction of the image reading unit, and the positions of the interrupted parts located in one of the shorter sides and those of the interrupted parts located in the other of the shorter sides are staggered.

9. The image reading apparatus according to claim 8, wherein the glass sheet supports protruding from the lower frame are provided to locate in the shorter sides of the opening, which is covered with the contact glass sheet, of the upper frame, the shorter sides being orthogonal to the reciprocating direction of the image reading unit, and the positions of the glass sheet supports in one of the shorter sides and those of the glass sheet supports provided to locate in the other of the shorter sides are staggered, the positions of the glass sheet supports corresponding to those of the interrupted parts.

10. The image reading apparatus according to claim 8, wherein said interrupted parts and glass supports are located so that they differs in number in the two opposing sides and those located in each side are arranged symmetrically about the center line crossing the sides.

11. The image reading apparatus according to claim 2, wherein said adhesive member is a double-sided adhesive tape which is made of tape-shaped base material with an adhesive applied to both faces thereof.

12. The image reading apparatus according to claim 2, wherein slit openings are provided in the side wall of the upper frame at positions corresponding to the interrupted parts for inserting a removing tool of flat-blade screwdriver-like to remove off the contact glass sheet.

13. An image reading apparatus having an image reading unit mounted to be able to be reciprocated in the frame body of the apparatus and a contact glass sheet on which a manuscript sheet is placed to be scanned mounted on the frame body, wherein said frame body comprises an upward-open lower frame in which said image reading unit is accommodated to be able to be reciprocated in a longitudinal direction of the frame body, and an upper frame having an opening on the upper face thereof to be covered with said contact glass sheet, the contact glass sheet is attached to the upper frame with an adhesive member provided along a brim part of the opening to be covered by the contact glass sheet to be adhered to an undersurface of the upper frame, said upper and lower frames are assembled detachably by means of fitting portions provided to both frames, and the lower frame is provided, in an area underneath the contact glass sheet, with glass sheet supports protruding from said lower frame.

14. The image reading apparatus according to claim 13, wherein the glass sheet supports are provided to protrude from an inside region of said lower frame opening into the area underneath the contact glass sheet.

\* \* \* \* \*